May 31, 1960 A. M. THOMSEN 2,938,817
METHOD OF DE-SUGARING MOLASSES
Filed Jan. 16, 1957
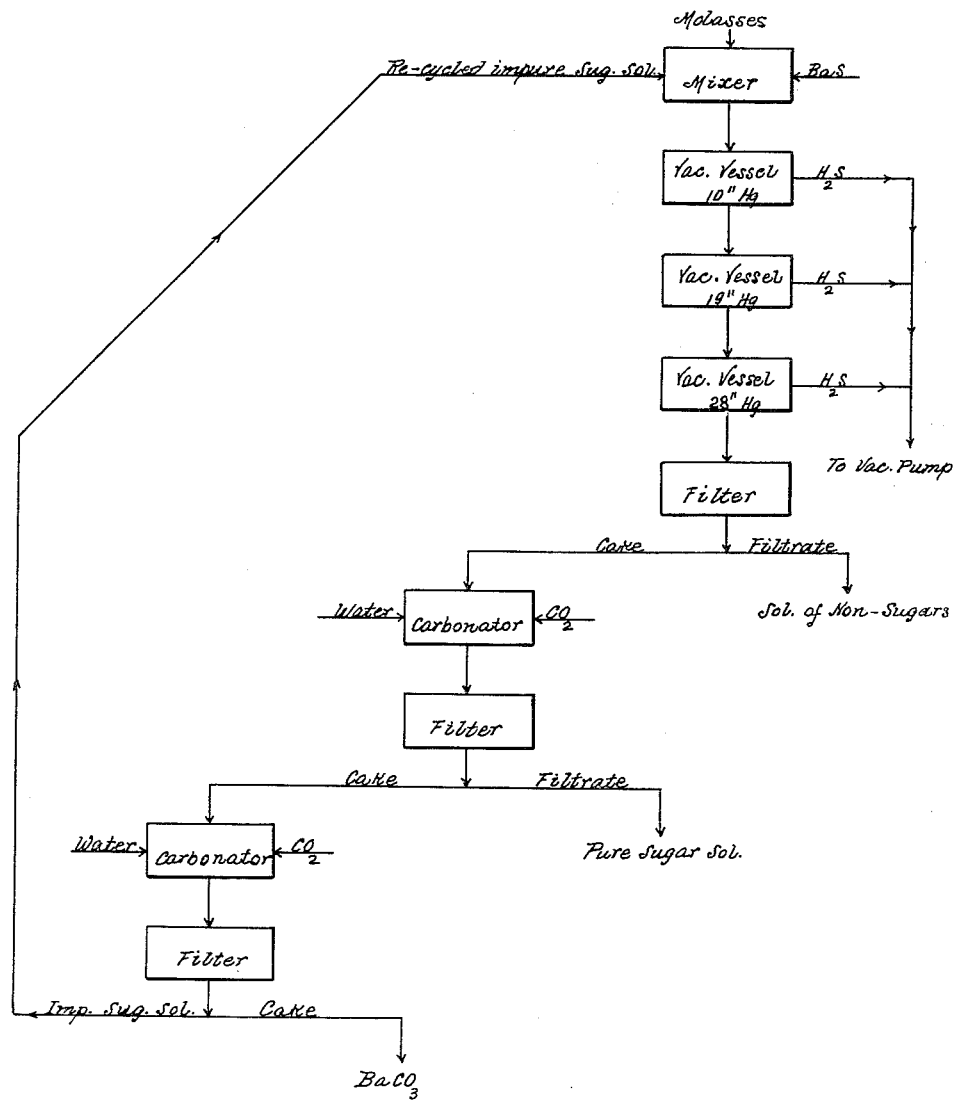
INVENTOR.
Alfred M. Thomsen.

United States Patent Office 2,938,817
Patented May 31, 1960

2,938,817
METHOD OF DE-SUGARING MOLASSES

Alfred M. Thomsen, 265 Buckingham Way, Apt. 402, San Francisco 27, Calif.

Filed Jan. 16, 1957, Ser. No. 634,409

1 Claim. (Cl. 127—47)

This application is a continuation, in part, of the disclosure previously made and bearing the same title, the Ser. No. 391,229, and the filing date of Nov. 10, 1953. It is the aim and object of my process to obtain substantially all the sugar resident in molasses as a very pure sugar solution and the non-sugars, both organic and inorganic likewise present in said molasses in a substantially concentrated form totally unlike the excessively dilute material now obtained in practicing the Steffen's method of de-saccharification.

While my method, properly considered, is independent of the apparatus employed yet it is simpler to visualize my procedure by describing at the same time a suitable apparatus in which it may be performed. The reaction consists in bringing together barium sulphide, which in solution hydrolyzes to a mixture of barium hydroxide and barium sulphhydrate, and molasses, preferably from beets, in such a manner that barium saccharate is formed and then separated from the non-sugars. Subsequently said barium saccharate is decomposed with carbon dioxide to give barium carbonate and a very pure sugar solution. In a sense this is very old technique but whenever tried it has universally ended in failure and abandonment.

My process may, therefore, be considered as a combination of steps whereby this old, discarded process becomes a workable entity. I commence by making the conventional anhydrous barium sulphide by a reduction of heavy spar with carbon. Such technique is too well known to require description. Instead of water I dissolve this sulphide in a dilute very impure sugar solution obtained at the very last step in my process. I now commingle this barium solution with molasses in a three stage vacuum apparatus consisting of three separate but interconnected vessels each one of which is equipped with an agitator to keep the barium saccharate slurry mobile.

The first vessel is maintained at a vacuum corresponding to 10 in. of mercury, the second to 19 in., and the third to 28 in. or as near that as is feasible. This is best done by interposing a positive pressure blower, or its equivalent, between the stages and before the first stage and atmosphere. The customary condensers and vacuum pump is unavailing in this case as much hydrogen sulphide is to be exhausted.

Two separate streams consisting of the barium solution and of molasses, respectively, are drawn into the first chamber where they commingle with a large reservoir of slurry containing much preformed barium saccharate. In consequence, there is but little fresh grain formed, most of the barium saccharate produced from the reacting solutions being deposited on the particles already formed thus yielding a coarse grain easily separated and washed. Simultaneously, of course, the corresponding amount of hydrogen sulphide is aspirated by the positive pressure blower acting as a vacuum producing device. A corresponding amount of slurry is meanwhile drawn into the second stage by the difference in vacuum and a similar amount is drawn into the third stage, from which the equivalent amount is also removed by a pump or by a "vacuum leg" so that all vessels retain the same amount of slurry and keep the same level.

The temperature of the slurry, or magma, is obviously controlled by the degree of vacuum maintained in the various vessels but the over-all effect is that crystallization of the saccharate takes place between a low of 100° F. and a high of 185° F. The slurry drawn from the last vessel is filtered in any conventional manner and thoroughly washed. The filtrate is further worked for its soluble barium, which must always be in slight excess, as well as for the contained nitrogen compounds and the inorganic molasses constituents, largely potash. Such further treatment, though economically of the utmost importance, is beyond the scope of the instant disclosure.

The washed saccharate is next suspended in clear water in another vessel and gases containing carbon dioxide are admitted. Very dilute gas, such as washed combustion products from boiler fires, is adequate and complete decomposition is effected. If such decomposition be done in a single stage a rather impure sugar solution will be obtained. I find, however, that if the process be interrupted when the solution, after removal of the suspended matter, corresponds to a pH of 9 or more, then said sugar solution will be very pure, as high purity as 99.6 being not uncommon.

After such filtration for removal of the pure sugar solution, the cake is once more suspended in water and gas passed again until a pH of 7 or less is obtained. This second solution will contain some sugar and will, in general, have a purity as low as 80 or less. It is advantageously employed as the means of preparing the initial barium sulphide solution, or for diluting molasses just prior to entry into the first of the series of vacuum vessels, at the discretion of the operator.

The barium slurry obtained in the latter step is then filtered to obtain said solution and a cake of barium carbonate, this latter constituting a valuable by-product being pure enough to go forthwith to the electric furnace for conversion to barium oxide. In fact, economically, this barium conversion is as important as the sugar recovery. All barium work today is virtually based on the conversion of heavy spar to sulphide as a primary step. But while weak chimney gas will convert said sulphide to carbonate the resultant spent gas is so low in hydrogen sulphide that its recovery has everywhere been discontinued and without such usage it becomes an intolerable nuisance, hence other means, such as decomposition with sodium carbonate, has been substituted. In the instant case, the introduction of the commercially profitable sugar step permits of the use of weak chimney gas, the carbonating agent, and yet yields the hydrogen sulphide in concentrated form. Having thus described my process in general terms in order to make my innovations plain I will now give, in fuller detail, so that no difficulty will be experienced in operation, every technical requirement. This will thus constitute the special embodiment of my process, and is illustrated in the attached drawing which is self-explanatory.

The saccharate precipitation step requires 60% of the weight of sucrose recovered in the form of barium sulphide. Beet molasses average about 48% of sucrose. A plant to process 50 tons of molasses per day will thus require a calculated amount of barium sulphide amounting to 15 tons but a 5% excess should be allowed. The manufacture of said sulphide is so absolutely conventional that no instructions are needed. The clinker from the barium furnace is then dissolved in the impure sugar solution from the last step of the process. Instead, a very strong barium solution can be made with water and then subsequently diluted with the weak sugar solution to form a liquor with 20% BaS.

The apparatus consists of three vertical closed tanks interconnected at the bottom for the passage of slurry and at the top for the passage of gas, as previously described. Tanks 6 ft. in diameter and 18 ft. high, kept two-thirds full of slurry will process the amount involved. Into the first tank will be drawn two tons of molasses per hour and the corresponding amount of barium solution being simultaneously added. Residence of the reacting chemicals should thus be approximately 6 hours before reaching the discharge point. Actual density of the magma can, of course, be varied at will, the test of good work being substantially no sucrose in the filtrate from the slurry that is being withdrawn.

After filtration and careful washing the saccharate cake is re-pulped with sufficient water to make a mobile slurry and gas is then passed until a pH of 9 is reached. It is aimed to have a 20% solution of sucrose of a purity corresponding to 99.5 at the end point and this having been obtained, on a batch basis, the proper ratio of water has been established and will be used on succeeding batches. The magma is filtered, the sugar solution sent to the evaporators, and the cake re-pulped and retreated with fresh gas. The term "gas," herein, being duly scrubbed combustion gases as the source of carbon dioxide. In the second "gasing" the end point is when the polariscope no longer shows an increase in sugar content in the solution. In general, this would also be when the pH passes 7, but should be checked. The amount of water is determined by the need for dilution in the initial saccharate step so that all sugar liberated in this final step may be re-cycled without need of separate processing of this impure sugar solution. I have indicated "filters" throughout for the separation of solids from liquids but obviously any other method to effect such separations could be used without prejudice.

It is assumed that the respective vacuum vessels are staged at 10, 19 and 28 in. as before mentioned making the temperature self-regulating. A single vessel on a batch basis could, of course, be used and I do not limit myself to a three-phase system though that is advantageous. In that event, temperatures should be kept within the previously mentioned brackets, to wit: between a low of 100° F. and a high of 185° F.

Having thus fully described my process, I claim:

The process of de-sugaring molasses which comprises; commingling molasses continuously with an amount of barium sulphide in excess of the stoichiometric amount required to form barium saccharate with the sucrose of said molasses, with a re-cycled diluting medium consisting of the impure sucrose solution obtained in the second carbonation step in the process, and with a magma of pre-formed barium saccharate retained in a series of interconnected vessels under a vacuum grading from a low of approximately 10 inches of mercury to a high of approximately 28 inches, said mixture of molasses, barium sulphide, and dilute impure, re-cycled sucrose solution being passed in continuous flow through said series of vessels in the direction of the increasing vacuum until substantially all the resident sucrose shall have formed barium saccharate and the hydrogen sulphide simultaneously evolved shall have been removed in maintaining said vacuum; withdrawing continuously an amount of said magma equivalent to the amount produced by the additive molasses, re-cycled sugar solution and barium sulphide; separating said withdrawn portion into a substantially sugar-free solution, consisting of non-sugar molasses ingredients, and substantially insoluble barium saccharate; washing said barium saccharate until substantially free from adherent non-sugar molasses ingredients; suspending the barium saccharate thus obtained in water and carbonating the resultant slurry in a two-stage carbonating operation by passing a gas containing carbon dioxide through said slurry until the pH of the sugar solution thus being produced shall become approximately 9, this constituting the first carbonating stage; separating the sugar solution, of high purity, thus obtained from the insoluble suspended solids, consisting of an indefinite mixture of barium carbonate and undecomposed barium saccharate; suspending said mixture of barium carbonate and saccharate once more in water and carbonating once more in a second stage by passing gas containing carbon dioxide through the same until all barium saccharate shall have been converted to carbonate with attendant liberation of all contained sucrose; separating the resultant solution of sucrose, of relatively low purity, from the suspended barium carbonate and re-cycling said impure sucrose solution thus produced in the second carbonating stage as the diluting medium specified in the first commingling step of the process.

References Cited in the file of this patent

UNITED STATES PATENTS

| | | |
|---|---|---|
| 1,878,145 | Halven | Sept. 20, 1932 |
| 2,380,087 | Thomsen | July 10, 1945 |
| 2,488,974 | Hradecky | Nov. 22, 1949 |

FOREIGN PATENTS

| | | |
|---|---|---|
| 6,508 | Great Britain | 1896 |
| 16,009 | Great Britain | 1896 |
| 16,441 | Great Britain | 1896 |
| 18,429 | Great Britain | 1897 |

OTHER REFERENCES

Ware: Beet Sugar Mfg. and Refining, vol. 2, 1907, pp. 509, 510, New York.